United States Patent [19]

Gallo et al.

[11] Patent Number: 5,186,351
[45] Date of Patent: Feb. 16, 1993

[54] SLURRY TANK

[75] Inventors: John R. Gallo, Modesto; Gregory J. Coleman, Fresno; Claude E. Brown, Lodi, all of Calif.

[73] Assignee: San Joaquin Valley Express, Modesto, Calif.

[21] Appl. No.: 622,126

[22] Filed: Dec. 3, 1990

Related U.S. Application Data

[63] Continuation of Ser. No. 229,085, Aug. 5, 1988, abandoned.

[51] Int. Cl.$^5$ ............................................. B61D 87/00
[52] U.S. Cl. .................................. 220/563; 220/401; 220/402; 220/668; 220/671
[58] Field of Search ............... 220/563, 402, 668, 671, 220/401, 72, 73

[56] References Cited

U.S. PATENT DOCUMENTS

| | | | |
|---|---|---|---|
| 1,562,074 | 11/1925 | Baum | 220/563 |
| 2,269,617 | 1/1940 | Borstel | 220/563 |
| 3,225,362 | 12/1965 | Barrera | 220/562 |
| 3,912,103 | 10/1975 | Gerhard | 220/1.5 |
| 3,912,107 | 10/1975 | Baumann | 220/563 |
| 4,040,461 | 8/1977 | Carson | 220/401 |
| 4,065,022 | 12/1977 | Cainaud | 220/1.5 |
| 4,169,537 | 10/1979 | Sabreen et al. | 220/72 |
| 4,254,885 | 3/1981 | Fouss et al. | 220/72 |
| 4,359,084 | 11/1982 | Geverant et al. | 220/1.5 |
| 4,453,875 | 6/1984 | Johnson, Sr. | 220/403 |
| 4,589,565 | 5/1986 | Spivey | 220/1.5 |
| 4,614,278 | 9/1986 | Gerhard | 220/401 |

Primary Examiner—Joseph Man-Fu Moy
Attorney, Agent, or Firm—Townsend and Townsend

[57] ABSTRACT

A tank (2) specially suited for transporting slurries, such as wine grapes (60), while reducing the tendency of the slurry to surge during transport. The tank includes an outer frame (6) and an inner container (4). The frame, typically made of steel, defines a central open region (5) within which the container is supported. The container is preferably plastic, or other thermal insulating material, to reduce heat transfer through the walls of the containers to the slurry. The circumferential sidewall (8) of the container has vertical corrugations (52) sized and spaced to inhibit surging of the slurry material within the tank during transport on a truck (47).

12 Claims, 2 Drawing Sheets

SLURRY TANK

This is a continuation of Ser. No. 229,085 filed Aug. 5, 1988, abandoned.

BACKGROUND OF THE INVENTION

Many products are transported in bulk in open top tanks or bins. Wine grapes are often transported in this way from the field to the winery. Once at the winery the tank is unloaded, typically by tipping the tank into an appropriate receptacle. Having an open top aids both filling the tank in the field and emptying the tank at the winery.

One of the problems associated with transporting wine grapes is that the wine grapes often act like a slurry material when transported in large tanks. This tendency is accentuated when the grapes are mechanically harvested since mechanically harvested grapes are detached from their stems during harvesting. Thus, if the transport driver is not careful, and sometimes even if the driver exercises great care, the slurry like material may roll and surge within the tank thus allowing some of the grapes to leave the tank and be lost.

SUMMARY OF THE INVENTION

The present invention is directed to a two-part tank, including an inner container and an outer frame, useful for containing and transporting slurries and slurry-like materials, such as newly harvested wine grapes, while reducing the tendency of the slurry to roll and surge during transport. This is achieved by providing appropriately sized and positioned vertical corrugations on the inner surface of the container. The container is preferably a one piece plastic container and is supported by the sturdy external frame, typically of steel. The two part construction permits the plastic container to be replaced when damaged. The choice of plastic material for the container permits the container to be easily cleaned, reduces the weight of the tank and also acts as a thermal insulator so to keep the grapes, or other slurry material within the container from being damaged by heat. This is quite important since grapes are grown in warm areas and often must be picked and transported during the day when the weather is hot.

The tanks are typically rectangular so the container includes two lateral sides, a front side and a rear side. Providing vertical corrugations around the entire circumferential sidewall inhibits surging which can occur fore and aft as well as side to side.

Other features and advantages of the invention will appear from the following description in which the preferred embodiment has been set forth in detail in conjunction with the accompanying drawings.

DETAILED DESCRIPTION OF THE PREFERRED EMBODIMENT

Figure 1:
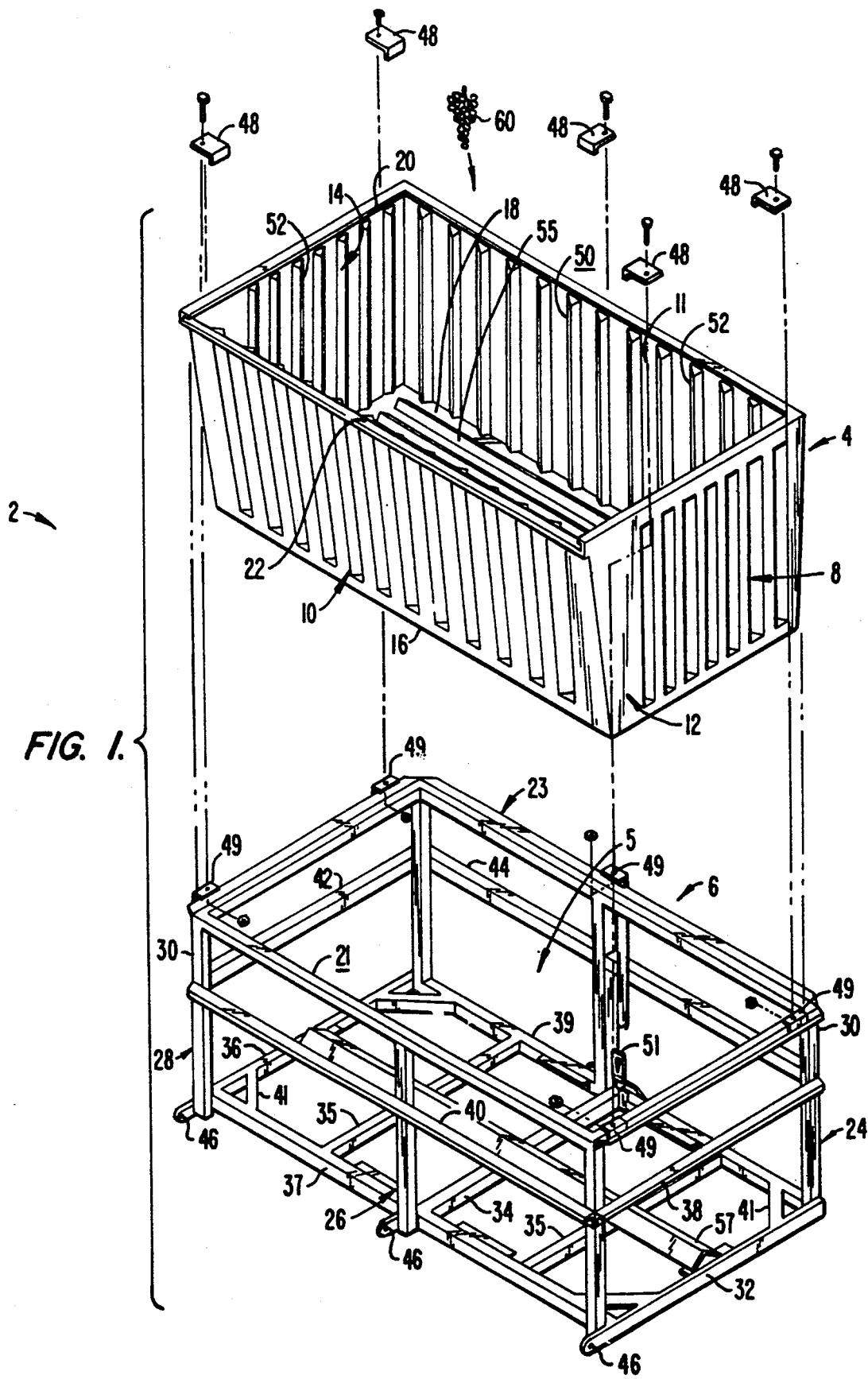
FIG. 1 is an exploded isometric view of a tank made according to the invention.

Referring now to the figures, a tank 2 is shown to include a plastic container 4, preferably made of cross link polyethylene, supported within a central open region 5 of a sturdy steel frame 6. Container 4 includes a circumferential sidewall 8, which includes a pair of lateral sides 10, 11, a front side 12 and a rear side 14. The lower edge 16 of circumferential sidewall 8 is continuous with a bottom 18. The upper edge 20 of sidewall 8 has a lip 22 along and above lateral side 10 configured to engage and overlie an upper surface 21 along one edge of a rectangular upper rim 23 of frame 6.

Figure 2:
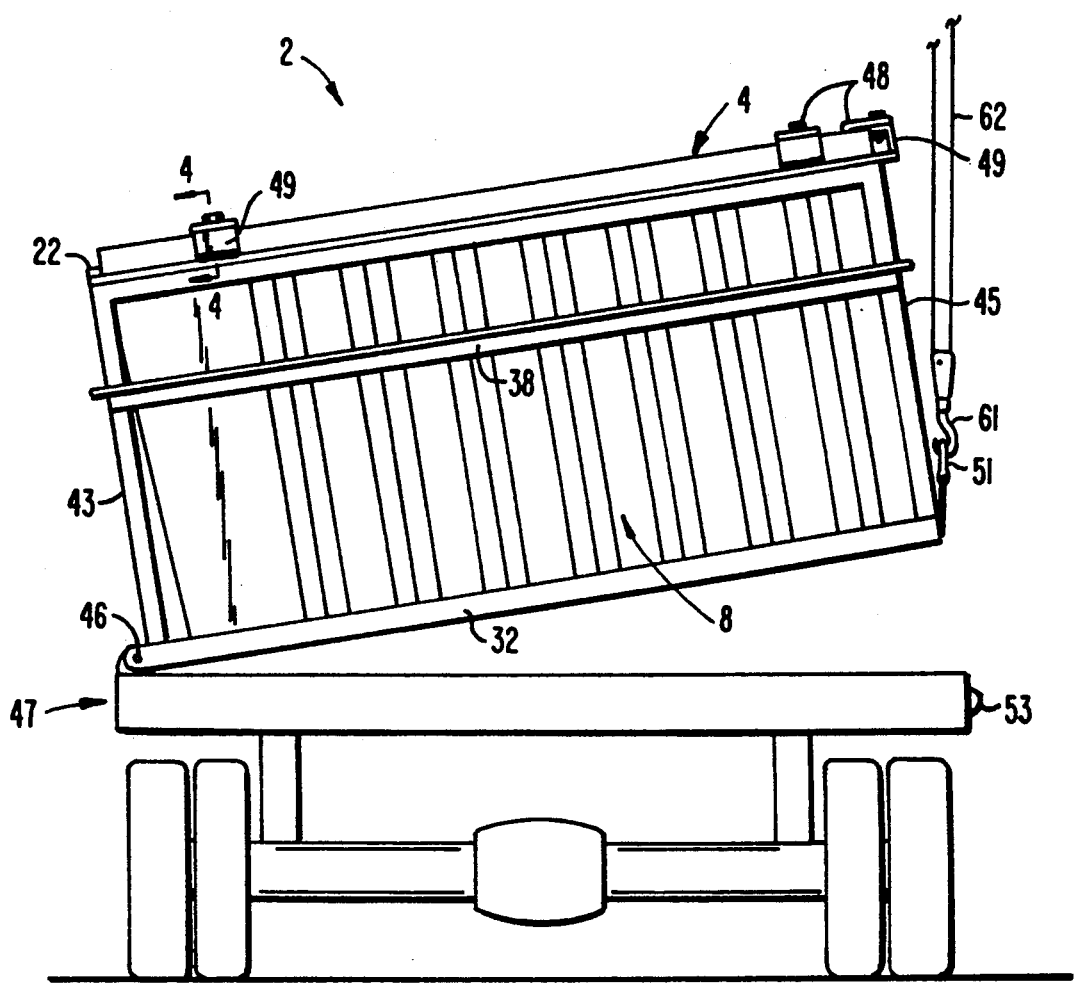
FIG. 2 is an end view of the tank of FIG. 1 being unloaded.

Frame 6 includes U-shaped support members 24, 26, 28, each having an L-shaped cross section, the upper ends 30 being welded to and depending from rim 23. Bights 32, 34 and 36 of members 24, 26, 28 provide support surfaces upon which bottom 18 rests when container 4 is mounted within frame 6 as shown in FIG. 2. Additional support is supplied by bottom bracing members 35 which extend between edge bracing 37, 39. Intermediate bracing members 38, 40, 42, 44 are secured to intermediate portions of the legs of support members 24, 26, 28. Corner braces 41 are used at the lower corners of frame 6 for strength.

Pivot eyes 46 are mounted to the ends of bights 32, 34, and 36 beneath surface 21 and external of edge bracing 37 to permit one side 43 of tank 2 to be secured in place upon a vehicle 47. The other side 45 of tank 2 is secured to vehicle 47 by a pivotal lift eye 51 secured to member 26 and connected to a conventional tie down winch 53 on vehicle 47. Pivot eyes 46 are also used as pivot points at which tank 2 can be pivoted for emptying as shown in FIG. 2.

Figure 3:
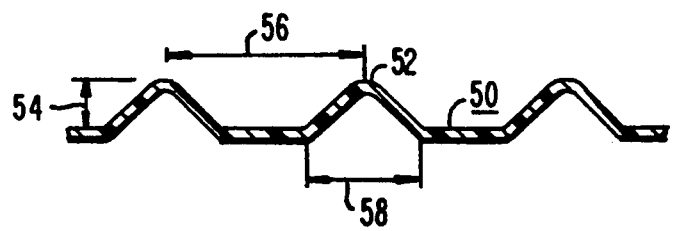
FIG. 3 is a cross-sectional view of a portion of the circumferential sidewall of the tank of FIG. 1.

Circumferential sidewall 8 has an inner surface 50 with numerous vertical corrugations 52 formed along sides 10, 12 and 14. Bottom 18 has a number of horizontal corrugation 55 extending between sides 12, 14. As shown in FIG. 3, corrugations 52 have a height 54, a lateral spacing 56 and a width 58. The preferred embodiment of tank 2 is used for holding and transporting wine grapes. It has been found that corrugations 52 having a height 54 of 8 cm, a lateral spacing 56 of 26 cm, and a width 58 of 16 cm has proven effective to inhibit surging and rolling of the slurry-like grape material 60 for a tank 2 having dimensions of about 125 cm high, 249 cm wide at the top, 224 cm at the bottom and 345 cm long.

Corrugations 52, 55 also provide strength to container 4 as well as reduce surging. Being of plastic, container 4 also helps to prevent overheating of the grape material 60 carried within tank 2. If a container 4 becomes unusable, such as because it becomes contaminated or is damaged beyond repair, such container 4 can be discarded and a new container 4 can be used with frame 6 so that the entire tank 2 need not be replaced in such an event.

Figure 4:
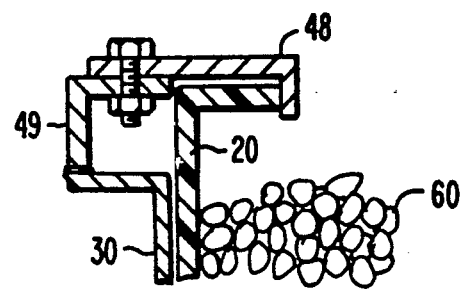
FIG. 4 is a cross-sectional view taken along line 4—4 of FIG. 2.

Clips 48, see FIGS. 1 and 4, are bolted to L-brackets 49 which are welded at five positions along rim 23. Clips 48 are used to secure upper edge 20 of container 4 to rim 23 above lateral, front and rear sides 11, 12, 14 of container 4 to keep it from falling out of frame 6 when tipped. Frame 6 also includes an inverted V-brace 57, mounted above bights 32, 34, 36 and bracing members 35, which engages a similarly shaped horizontal corrugation 55 in bottom 18 of container 4. V-brace 47 helps to hold container 4 in place when dumping.

Tank 2 is mounted to vehicle 47 and secured in place through the three pivot eyes 46 on one side 43 and pivotal lift eye 51 on other side 45. After container 4 is filled with, for example, grape material 60, vehicle 47 and tank 2 therewith are transported to the winery for processing of grape material 60, typically to make wine. During movement of tank 2, any tendency of slurry-like grape material 60 to roll or surge within container 4 is inhibited by vertical corrugations 52 and horizontal corrugation 55. Corrugations 52 inhibit fore and aft movement of grape material 60 while corrugations 52 and 55 inhibit side to side movement. Once at the winery, lift eye 51 is released from tie down winch 53. Lift hook 61, connected by lines 62 to an overhead crane, not shown, is connected to lift eye 51 and is raised by the crane to tilt tank 2 about eyes 46 so to empty the contents of tank 2 over lip 22 and into a suitable receptacle, not shown.

Modification and variation can be made to the disclosed embodiment without departing from the subject of the invention as defined in the following claims. For example, vertical corrugations 52 may be configured so as not to be straight and not perfectly vertical.

What is claimed is:

1. A tank and frame assembly for containing and transporting slurry and slurry-like material comprising:
    an outer frame defining a central open region;
    an inner, slurry-material-containing releasably secured to the outer frame and sized to be supported within the central open area, said container being fabricated from a plastic material and providing thermal insulation; and
    the container having a circumferential sidewall with an inner surface against which the material rests, the inner surface having generally vertical corrugations sized to inhibit surging of the material during transport.

2. The tank of claim 1 wherein the outer frame is steel.

3. The tank of claim 1 wherein the circumferential sidewall has a non-porous inner surface.

4. The tank of claim 1 wherein the circumferential sidewall includes four generally rectangularly arranged sides.

5. The tank of claim 1 further including a pivot element on the outer frame for pivotally securing the tank to the vehicle.

6. The tank of claim 1 wherein the container has a bottom with an inner bottom surface having generally horizontal corrugations.

7. The tank of claim 1 wherein the outer frame includes a frame base and a stabilizer extending upwardly from the base, and wherein the container includes a bottom and a depression in the bottom sized and positioned for engagement with the stabilizer so to stabilize the container when the tank is tilted.

8. The tank of claim 1 further comprising clips for securing the container to the frame.

9. A tank and frame assembly for containing and transporting slurry and slurry-like material on a vehicle comprising:
    an outer sturdy metal frame having a frame base and a stabilizer extending upwardly from the frame base, the outer frame defining a central open region;
    the outer frame including a rectangular top rim having lateral rim sides and end rim sides, the end rim sides including laterally-extending lips;
    the outer frame including means for pivotally mounting the outer frame to the vehicle;
    an inner, slurry-material-containing rectangular container, made of a thermally insulating plastic material, sized to be supported within the central open area of the outer frame;
    the container including a circumferential rim, having lateral sides and end sides, sized to lie adjacent the rectangular top rim of the outer frame;
    the container having a circumferential sidewall with an inner surface against which the material can rest, the inner surface having generally vertical corrugations sized to inhibit surging of the material during transport; and
    a plurality of clips for releasably securing the lips of the end rim sides to end sides of the circumferential rim of the container while the material is being dumped out of the tank over the horizontally extending lip of the circumferential container rim.

10. A method for reducing surging of slurry and slurry-like material during transport comprising the following steps:
    selecting a tank including an outer frame and a removable inner container having an open top, the inner container being fabricated from a plastic material having a circumferential sidewall with an inner, material contacting surface; and
    providing generally vertical corrugations on the inner surface to inhibit surging of the material during transport.

11. The method of claim 10 wherein the selecting step includes selecting an inner, thermally insulating container to prevent excessive heat transfer through the plastic container.

12. The method of claim 10 wherein the selecting step includes selecting an inner container having four sides.

* * * * *